(12) United States Patent
Julliard et al.

(10) Patent No.: US 7,520,522 B2
(45) Date of Patent: Apr. 21, 2009

(54) BICYCLE FRAME

(75) Inventors: Eric Julliard, Nevers (FR); Jean-Pierre Couturet, Nevers (FR)

(73) Assignee: Look Cycle International, Nevers (FR)

( * ) Notice: Subject to any disclaimer, the term of this patent is extended or adjusted under 35 U.S.C. 154(b) by 469 days.

(21) Appl. No.: 11/416,186

(22) Filed: May 3, 2006

(65) Prior Publication Data

US 2007/0108724 A1 May 17, 2007

(30) Foreign Application Priority Data

May 4, 2005 (FR) .................................. 05 04551

(51) Int. Cl.
*B62K 7/00* (2006.01)
(52) U.S. Cl. .................... 280/281.1; 280/277; 280/278; 280/285; 280/286
(58) Field of Classification Search ......... 280/274–278, 280/281.1, 284–288, 288.1–288.3
See application file for complete search history.

(56) References Cited

U.S. PATENT DOCUMENTS

| | | | | |
|---|---|---|---|---|
| 5,129,666 A | * | 7/1992 | Lai | ........................ 280/281.1 |
| 5,259,637 A | * | 11/1993 | Busby | ........................ 280/284 |
| 5,588,662 A | | 12/1996 | Fortier et al. | |
| 5,842,711 A | | 12/1998 | Legerot et al. | |
| 5,865,456 A | | 2/1999 | Busby et al. | |
| 5,906,385 A | * | 5/1999 | Voss | ........................ 280/288 |
| 6,073,950 A | * | 6/2000 | Busby | ........................ 280/284 |
| 6,974,144 B2 | * | 12/2005 | Horiuchi | ..................... 280/276 |
| 7,347,438 B2 | * | 3/2008 | Raddin | ....................... 280/279 |

FOREIGN PATENT DOCUMENTS

| | | |
|---|---|---|
| FR | 680 331 | 4/1930 |
| GB | 184 246 | 8/1922 |
| WO | WO 96/39322 | 12/1996 |

\* cited by examiner

*Primary Examiner*—Paul N Dickson
*Assistant Examiner*—Jacob Knutson
(74) *Attorney, Agent, or Firm*—Young & Thompson

(57) ABSTRACT

The frame includes at its rear portion two bases (12, 13) extending substantially horizontally rearwardly so as to define between them a space for the reception of a rear wheel, and two stays (14, 15) extending obliquely toward one respective end of the bases (12, 13) and being connected thereto at an acute angle by connection elements, a pair of recesses for a rear wheel axle being disposed substantially at the intersection of the stays (14, 15) with the bases (12, 13). Each recess of the pair of recesses has a first notch with a semicircular bottom (23) provided at one flattened end of a base and a second notch with a semicircular bottom (24) provided at a flattened end of a stay and disposed facing the first notch (23) such that the semicircular bottoms will be aligned with each other.

8 Claims, 2 Drawing Sheets

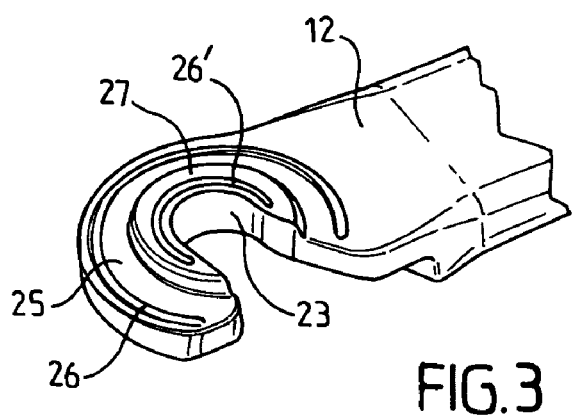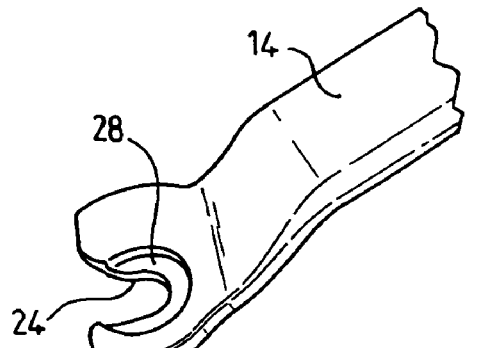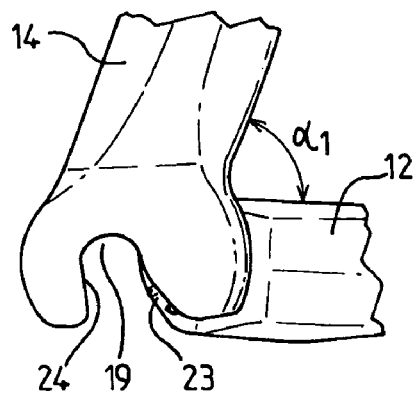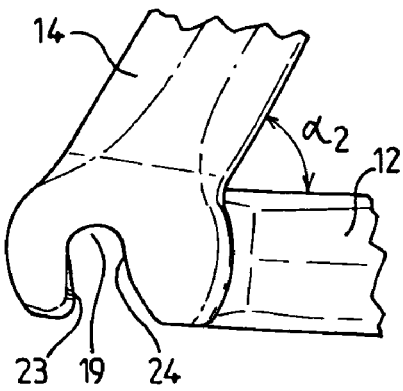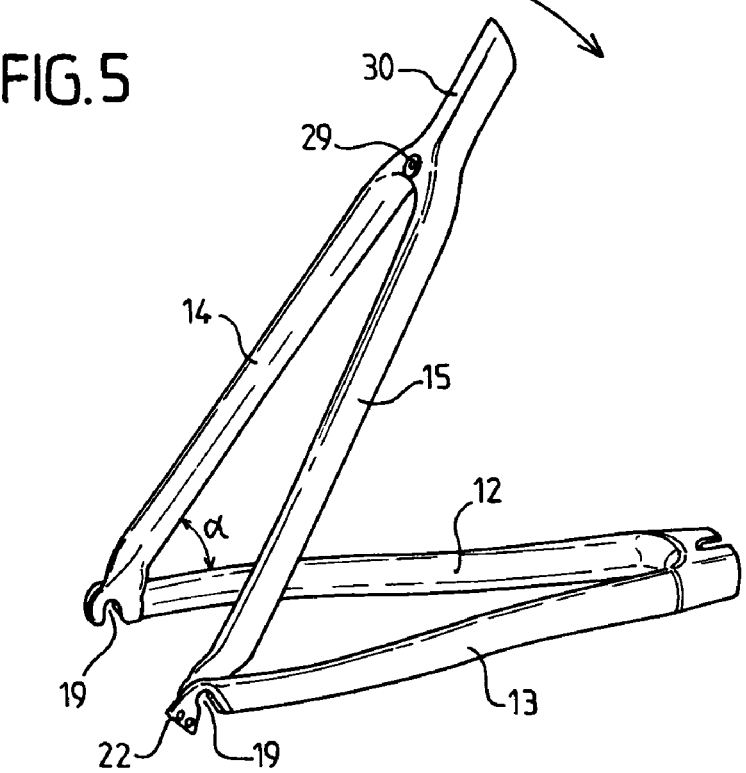

BICYCLE FRAME

The present invention relates to a bicycle frame and in particular the rear portion of the latter which comprises two elements forming stays connected to two elements forming a base, these elements being designed to permit the securement of the rear wheel on the bicycle.

In conventional metal frames, the elements forming stays and the elements forming bases are in general tubular and carry at their respective intersections a securement tongue for the rear wheel. This securement tongue is braised or secured to the end of the element forming a base and comprise a recess for the axle of the wheel.

In the case of a frame of composite material, the connection means between the ends of the stays and the bases are generally constituted by two applied metallic connection members. Each connection member comprises two arms of which one is inserted in the rear end of one of the bases and the other in the end of the corresponding stay. Each arm is associated with a collar which bears against the end of the respective base of the stay and the assembly of arm and collar is secured on these ends so as to connect the base to the stay at an acute angle defined by the angle between the two arms. As a result, this angle is not variable for adaptation to different sizes of frame by using a single or same connection member.

Each connection member moreover comprises a recess for the rear wheel axle in the form of a slot or notch directly downwardly and adapted to receive one of the ends of the wheel axle. The securement means of the wheel are constituted by the screw-threaded ends of the wheel axle which coact with gripping nuts.

One of the connection members moreover carries a securement tongue for a derailer.

In a modification, the connection members comprise a single bearing to be secured to the elements forming bases, whilst the elements forming stays are at their lower end secured to separate ferrules. These latter are then screwed and secured laterally on the upper portion of each connection member.

Even if the modular design of these frames permits producing different sizes of frame by using common elements, they nevertheless give rise to supplemental weight because of the connected metal connection members, the screws, etc.

So as to lighten the frames, particularly when they are of composite material, this problem has attemptedly been solved by using rear portions constituting an assembly integrating the elements forming bases, the elements forming stays, as well as tongues provided for receiving the wheel axle. However, the production of such frames is very complicated and the distribution of these frames has become extremely complicated or even impossible.

The object of the invention is to overcome the drawbacks of the known frames by providing a frame whose rear portion is lightened, easy to produce and permits the production of frames of different sizes with the maximum of simplicity.

The object of the invention is a bicycle frame, comprising three principal hubs connected to each other by elongated elements, the frame comprising at its rear portion two elements forming bases extending substantially horizontally rearwardly so as to define between them a space for receiving a rear wheel, and two elements forming stays extending obliquely toward one respective end of said bases by being connected at an acute angle by a connection means, a pair of recesses for a rear wheel axle being disposed substantially at the intersection of said stays with said bases, characterized by the fact that each recess of each pair of recesses is comprised by a first notch with a semicircular bottom provided at one flattened of a base and a second notch with a semicircular bottom provided at a flattened end of a stay and disposed facing said first notch, such that said semicircular bottoms will be aligned with each other.

According to other characteristics of the invention:
said connection means comprise means for securing the rear wheel axle adapted to grip said flattened end of each element forming a base against the flattened end of the corresponding stay;
said connection means comprise an adhesion means applied between said flattened end of each base and the flattened end of the corresponding stay;
one surface for application of said adhesion means is delimited outwardly by a rib in the arc of a circle on one or the other of said flattened ends of each base or corresponding stay, said rib being centered on said semicircular bottom of said first or second notch;
the stays are of a single piece resiliently deformable in flexure;
said connection means comprise moreover a tenon disposed on one or the other of said flattened end of each base and of the corresponding stay, said tenon being centered on the semicircular bottom of said first or second notch and directed toward the other of said ends so as to be received in a recess of complementary shape provided in this latter end and also centered on the semicircular bottom of the corresponding notch;
the tenon has a cylindrical shape;
the tenon has a conical shape;
at least one of said first and second notches has an outwardly flared shape so as to permit the introduction of a rear wheel axle into said recesses after modification of said acute angle;
said flared shape permits a modification of said acute angle of the order of 20° from a first extreme angular position to a second extreme angular position.

Other characteristics and advantages of the invention will become apparent from the description which follows, of a non-limiting embodiment of the invention, with reference to the accompanying drawings, in which:

FIG. 3 is a fragmentary perspective view of one of the ends of a base according to the invention;

FIG. 4 is a fragmentary perspective view of one of the ends of a stay according to the invention;

FIG. 5 is a side view of the base of FIG. 3 and of the stay of FIG. 4, after assembly, and in a first extreme angular position of one relative to the other;

FIG. 6 is a side view of the base of FIG. 3 and of the stay of FIG. 4, after assembly and in a second extreme angular position of one relative to the other;

FIG. 7 is a perspective view of the rear portion of the frame of FIG. 2, after assembly.

Figure 1:
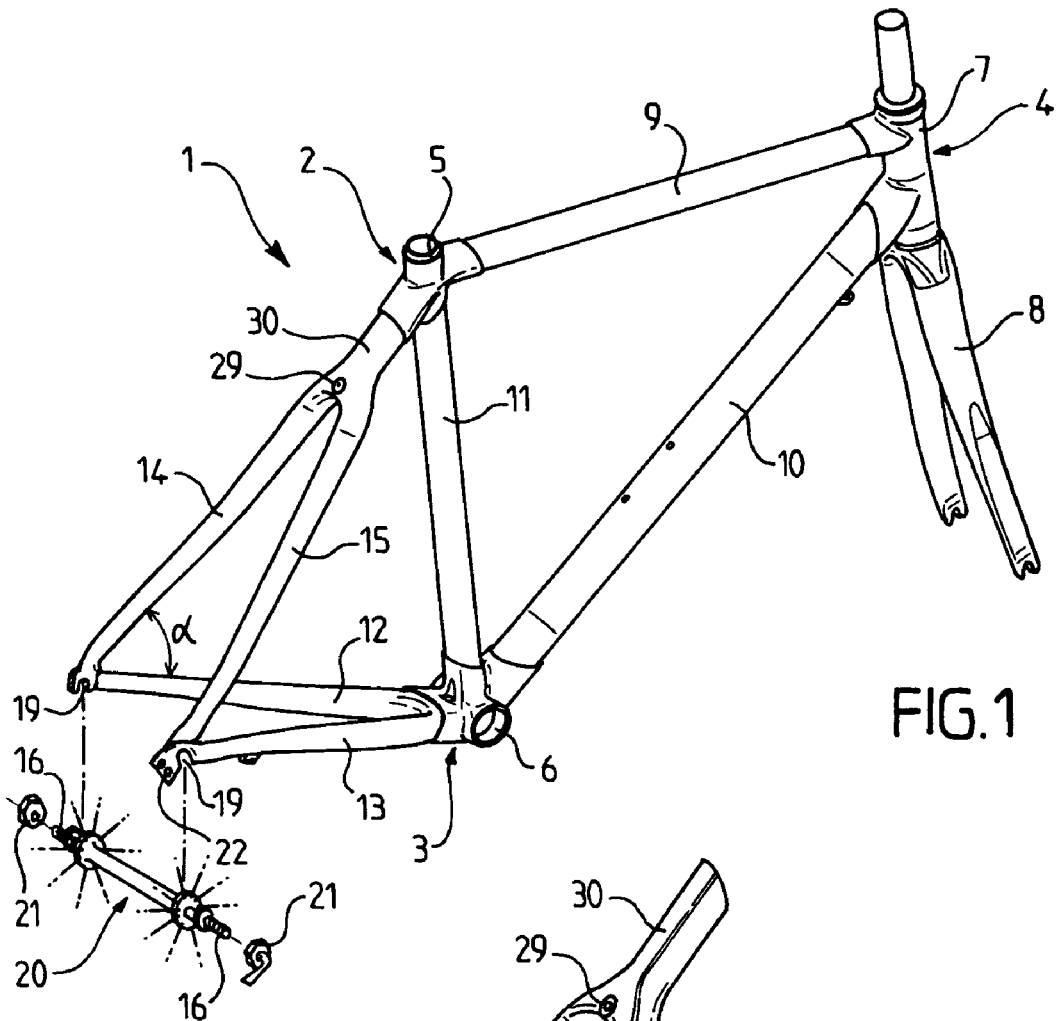
FIG. 1 is an assembly view of a frame according to the invention.
Figure 2:
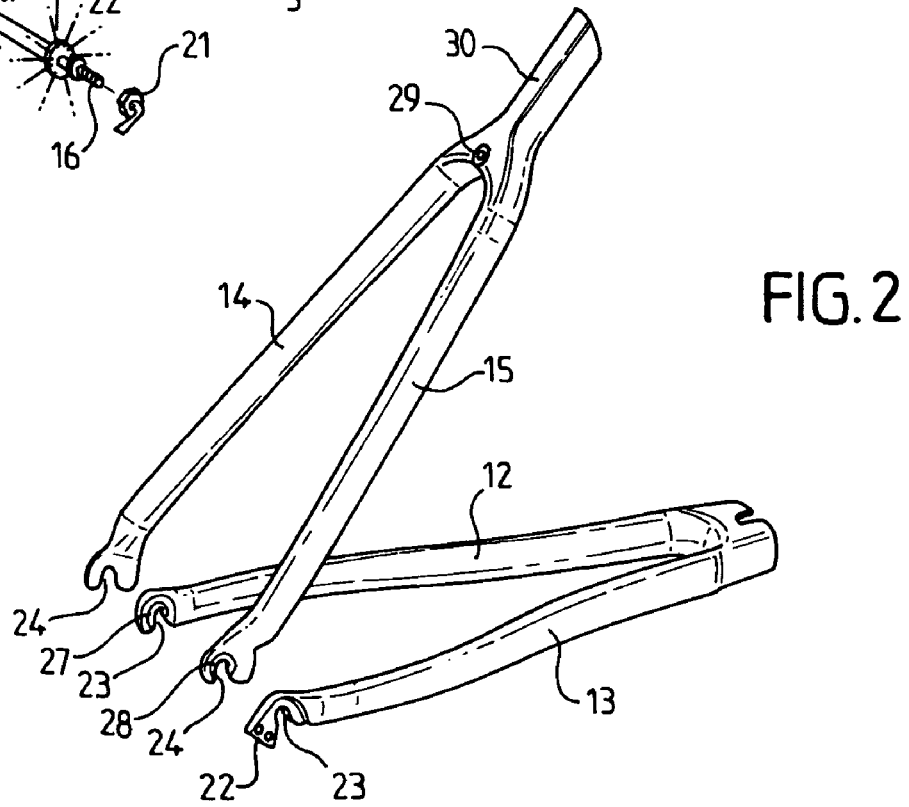
FIG. 2 is an exploded perspective view of the rear portion of a frame according to the invention.

FIG. 1 is an assembly view showing one embodiment of the invention in the example of a cycle frame 1 of composite material. This frame comprises three hubs 2, 3, 4 comprising respectively a saddle connection 5, a housing tube for the pedal assembly 6 and a steering tube 7. This latter is adapted to receive the upper end of a fork 8 carrying the front wheel (not shown) of the bicycle.

The three hubs 2, 3, 4 are connected to each other by elongated tubular elements, namely an upper or horizontal tube 9 which connects the saddle connection 5 to the steering tube 7, a diagonal tube 10 connecting the steering tube 7 to the pedal assembly housing tube 6, and a saddle tube 11 connecting the steering housing tube to the saddle connection 5.

The frame comprises at its rear portion two tubular elements forming bases 12, 13 extending substantially horizontally rearwardly so as to define between them a space for the reception of a rear wheel (not shown), and two tubular elements forming stays 14, 15 connected to the hub 2 and extending obliquely toward one respective end of the bases 12, 13. The stays 14, 15 are connected to the bases 12, 13 at an acute angle α with the help of connection means which will be described in detail later.

The connection means comprise a pair of recesses 19 for the rear wheel axle, these recesses being directed downwardly and adapted to receive one of the ends of a wheel axle 20. The securement means for the wheel are constituted by the screw-threaded ends 16 of the wheel axle 20, which coact with gripping nuts 21.

A pair of recesses 19 for the rear wheel axle is disposed substantially at the intersection of the bases 12, 13 with the stays 14, 15.

The invention relates to the rear portion of the bicycle frame and will now be described in greater detail with reference to FIGS. 2 to 7, showing on a larger scale this rear portion of the frame.

According to an important characteristic of the invention, each recess 19 of the pair of recesses for the rear wheel axle, is comprised by a first notch with a semicircular bottom 23 provided in one flattened end of a base 12, 13, and a second notch with a semicircular bottom 24 provided in one flattened of a stay 14, 15 and disposed facing the first notch 23 such that the semicircular bottoms will be aligned with each other.

So as to ensure this alignment during assembly of the frame, a cylindrical rod (not shown) is disposed transversely in the first and second notches 23, 24 such that the bottoms of these latter will rest on this rod before the bases 12, 13 and the stays 14, 15 are secured finally to the rest of the frame or to each other.

In their simplest form, the connection means comprise the securement means for the wheel axle 20 shown in FIG. 1. In this case, the nuts 21 are secured on the screw-threaded ends of the wheel axle 20 so as not only to ensure the securement of the wheel to the frame, but also to grip the flattened end of each base 12, 13 against the flattened end of the corresponding stay 14, 15. Of course, the bases 12, 13 and the stays 14, 15 have thus previously been fixed to the other elements of the frame and hence to each other such that the semicircular bottoms of the first and second notches 23, 24 will be aligned so as to present a homogeneous bearing surface to the wheel axle 20.

According to another embodiment, the connection means comprise adhesion means such as cement applied between the flattened end of each base 12, 13 and the flattened end of the corresponding stay 14, 15.

In the case of use of a cement, an application surface for cement 25 is advantageously delimited on the one hand outwardly on the flattened end of the base 12, 13 (see FIG. 3), or on that of the stay 14, 15, by a first rib in the arc of a circle 26, and on the other hand inwardly by a second rib on the arc of a circle 26'. This rib 26 is preferably centered on the semicircular bottom of the first notch 23 in the case in which it is located on the end of the base 12, 13, and in the contrary case on the semicircular bottom of the second notch 24.

To improve the mechanical strength of the connection between the bases 12, 13 and the stays 14, 15 in spite of various forces such as the weight of the cyclist, the traction of the chain particularly, the connection means can moreover comprise a tenon 27 disposed on one of the other end of the base 12, 13 (see FIG. 3) or of the corresponding stay 14, 15.

This tenon 27 has a cylindrical or conical shape and it is for example shown in FIG. 3 centered on the semicircular bottom of the first notch 23. The tenon 27 is directed toward the end of the other element so as to be received in a recess 28 of complementary shape provided in this latter end. This recess is also centered on the semicircular bottom of the corresponding notch, in this case the notch 24.

So as to permit a modification of the acute angle α between the bases 12, 13 and the stays 14, 15 as a function of the different sizes of frames produced from the same frame elements, the first notch 23 and/or the second notch 24 has an outwardly flared shape. Thus, it is possible to modify the maximum angle α1 shown in FIG. 5 corresponding to the maximum size of this frame up to the minimum angle α2 shown in FIG. 6 corresponding to the minimum size of this frame. The difference between the maximum angle α1 and the minimum angle α2 is of the order of 20° from a first extreme angular position corresponding to the maximum angle α1, to a second extreme angular position corresponding to the minimum angle α2.

For the production of frames of different sizes, the length of the bases 12, 13 is held constant, whilst the size differences, as to the rear portion of the frame, are provided entirely by the varied inclination (the angle α) of the stays 14, 15 relative to the bases 12, 13 and by adaptation of the length of the stays. For the modification of angle α, the presence of the tenon 27 and of the recess 28 is particularly advantageous because these two elements form in effect a pivot connection.

The stays 14, 15 are preferably in a single piece comprising a securement hole for the rear brake 29 and terminate at their upper part in a sleeve 30 connected to the saddle hub 2. To adapt the rear portion to different dimensions of frame, it suffices to modify the inclination between the bases 12, 13 and the stays 14, 15 and to have recourse simply to the length of the sleeve 30. It is to be noted that the distance between the center of the semicircular bottoms of the recesses 19 and the securement hole 29 remains constant and that the same piece can be used without a problem for different sizes of frame.

To facilitate the assembly in the case in which the stays 14, 15 are of a single piece provided with tenons 27 and recesses 28, this piece is pressed preferably resiliently deformable in flexure to be able to bring together its two ends and to release them when the tenons 27 enter the recesses 28 in a snap-in manner.

If the ends of the bases 12, 13 and of the stays 14, 15 are not permanently connected to each other by adhesion means, there is obtained a further advantage, namely, that after having withdrawn the rear wheel from the frame, it is then possible to space from each other the ends of the base 13 and of the corresponding stay 15, thereby creating a gap sufficient to permit the passage of the chain (not shown) without being required to disassemble it by opening a chain link.

The design of the rear portion of the frame according to the invention is particularly well adapted for pieces obtained by molding, produced for example of composite material, but even though certain of these advantages can be enjoyed for frames using more traditional materials and processes of assembly.

In all cases, the design of the frame according to the invention is greatly simplified and permits enjoying an economy of weight because no specific or supplemental member is any longer necessary to ensure the connection of the ends of the bases and the stays to each other: these elements are reduced to their simplest expression whilst performing the same functions.

Of course the invention is not limited to the examples shown and described, and those skilled in the art can envisage variations and modifications without thereby departing from the scope of protection of the present invention. Thus, it is of course possible to dispose the ends of the stays outside the ends of the bases whilst preserving the essential characteristics of the invention.

LOOK L050039 Bicycle Frame
α, α1, α2-angle FIGS. 1, 5, 6, 7
1-Frame
2-Hub
3-Hub
4-Hub
5-Saddle connection
6-Pedal mechanism tube housing
7-Steering tube
8-Fork
9-Upper tube (horizontal)
10-Diagonal tube
11-Saddle tube
12-Element forming base
13-Element forming base
14-Element forming stay
15-Element forming stay
16-Screw-threaded element (of 20)
19-Notch
20-Wheel axle
21-Nut
22-Securement tongue (of a derailer)
23-First notch
24-Second notch
25-Surface for application of cement
26-First rib (external)
26'-Second rib (internal)
27-Tenon
28-Recess
29-Securement hole (for rear brake)
30-Sleeve

The invention claimed is:

1. Bicycle frame, comprising three principal hubs (2 to 4) connected to each other by elongated elements (9, 10, 11), the frame comprising at its rear portion two elements forming bases (12, 13) extending substantially horizontally rearwardly so as to define between them a space for the reception of a rear wheel, and two elements forming stays (14, 15) extending obliquely toward one respective end of said bases (12, 13) and being connected thereto at an acute angle (α) by connection means, a pair of recesses (19) for a rear wheel axle being disposed substantially at the intersection of said stays (14, 15) with said bases (12, 13), wherein said pair of recesses is comprised by a first notch with a semicircular bottom (23) provided at one flattened end of one of said bases (12, 13) and by a second notch with a semicircular bottom (24) provided at a flattened end of one of said stays (14, 15) and dispose facing said first notch (23) such that said semicircular bottoms will be aligned with each other, said connection means comprises adhesion means applied between said flattened end of each base (12, 13) and the flattened end of the corresponding stay (14, 15), and an application surface (25) of said adhesion means is delimited outwardly by a rib in the arc of a circle (26) on one or the other of said flattened end of each base (12, 13) or of the corresponding stay (14, 15), said rib (26) being centered on said semicircular bottom of said first (23) or second (24) notch.

2. Bicycle frame according to claim 1, wherein said connection means further comprise securement means (20, 21) for the rear wheel axle adapted to grip said flattened end of each base (12, 13) against the flattened end of the corresponding stay (14, 15).

3. Bicycle frame according to claim 1, wherein the stays (14, 15) are of a single piece resiliently deformable in flexure.

4. Bicycle frame, comprising three principal hubs (2 to 4) connected to each other by elongated elements (9, 10, 11), the frame comprising at its rear portion two elements forming bases (12, 13) extending substantially horizontally rearwardly so as to define between them a space for the reception of a rear wheel, and two elements forming stays (14, 15) extending obliquely toward one respective end of said bases (12, 13) and being connected thereto at an acute angle (α) by connection means, a pair of recesses (19) for a rear wheel axle being disposed substantially at the intersection of said stays (14, 15) with said bases (12, 13), wherein,
said pair of recesses is comprised by a first notch with a semicircular bottom (23) provided at one flattened end of one of said bases (12, 13) and by a second notch with a semicircular bottom (24) provided at a flattened end of one of said stays (14, 15) and dispose facing said first notch (23) such that said semicircular bottoms will be aligned with each other, and
said connection means comprise moreover a tenon (27) disposed on one or the other of said flattened end of each base (12, 13) and of the corresponding stay (14, 15), said tenon (27) being centered on the semicircular bottom of said first (23) or second (24) notch and directed toward the other of said ends so as to be received in a recess (28) of complementary shape provided in this latter end and also centered on the semicircular bottom of the corresponding notch.

5. Bicycle frame according to claim 4, wherein the tenon (27) has a cylindrical shape.

6. Bicycle frame according to claim 4, wherein the tenon (27) has a conical shape.

7. Bicycle frame according to claim 1, wherein at least one of said first and second notches (23, 24) has an outwardly flared shape so as to permit the introduction of the rear wheel axle (20) in said recesses after a modification of said acute angle (α)

8. Bicycle frame according to claim 7, wherein said flared shape permits a modification of said acute angle (α) of the order of 20° from a first extreme angular position to a second extreme angular position.

* * * * *